United States Patent
Lin (10) Patent No.: US 12,523,862 B2
(45) Date of Patent: Jan. 13, 2026

(54) MICRO-ELECTRONIC NON-LANDING MIRROR SYSTEM

(71) Applicant: SHENZHEN LIGHTING INSTITUTE, Shenzhen (CN)

(72) Inventor: Andrew Lin, Shenzhen (CN)

(73) Assignee: SHENZHEN LIGHTING INSTITUTE, Shenzhen (CN)

( * ) Notice: Subject to any disclaimer, the term of this patent is extended or adjusted under 35 U.S.C. 154(b) by 837 days.

(21) Appl. No.: 17/790,782

(22) PCT Filed: Feb. 26, 2021

(86) PCT No.: PCT/CN2021/078128
§ 371 (c)(1),
(2) Date: Jul. 5, 2022

(87) PCT Pub. No.: WO2021/170081
PCT Pub. Date: Sep. 2, 2021

(65) Prior Publication Data
US 2023/0008066 A1    Jan. 12, 2023

(30) Foreign Application Priority Data

Feb. 27, 2020 (CN) .......................... 202010123368.2

(51) Int. Cl.
G02B 7/182 (2021.01)
B81B 3/00 (2006.01)
G02B 26/08 (2006.01)

(52) U.S. Cl.
CPC ........ *G02B 26/0841* (2013.01); *B81B 3/0013* (2013.01); *G02B 7/1821* (2013.01); *B81B 2201/042* (2013.01); *B81B 2203/04* (2013.01)

(58) Field of Classification Search
CPC  G02B 26/0841; G02B 7/1821; B81B 3/0013; B81B 2201/042; B81B 2203/04;
(Continued)

(56) References Cited

U.S. PATENT DOCUMENTS 5,661,591 A * 8/1997 Lin .................... G02B 26/0841
359/214.1
2002/0149071 A1   10/2002 Shim

FOREIGN PATENT DOCUMENTS

JP        2008046452 A    2/2008

* cited by examiner

*Primary Examiner* — Euncha P Cherry
(74) *Attorney, Agent, or Firm* — ScienBiziP, P.C.

(57) ABSTRACT

A micro-electronic non-landing mirror system includes a substrate, at least two supporting assemblies, at least two driving electrodes, a rotating mirror, and a driving circuit. The rotating mirror is elastically supported on the supporting assemblies through elastic reset assemblies. When the driving circuit applies a driving voltage, the rotating mirror moves closer to the driving electrode to which the driving voltage is applied within a range of movement that does not land on the substrate. When the driving circuit removes the driving voltage, the rotating mirror gets back to move away from the driving electrode under elastic restoring force of the elastic reset assemblies. Each elastic reset assembly includes at least two elastic reset units connected to different corners of the rotating mirror by a corresponding one supporting assembly. Each elastic reset unit is configured for providing the rotating mirror with at least two rotational degrees of freedom.

20 Claims, 4 Drawing Sheets

(58) Field of Classification Search
CPC .... B81B 2203/0163; B81B 2203/0307; B81B 2203/058; H01L 21/00
See application file for complete search history.

MICRO-ELECTRONIC NON-LANDING MIRROR SYSTEM

TECHNICAL FIELD

The present disclosure relates to the field of micro-electro-mechanical systems, and in particular, to a micro-electronic non-landing mirror system.

BACKGROUND

In an existing micro-electronic pixel mirror structure, generally a voltage applied between a substrate and a pixel mirror creates an electrostatic force to control a deflection of the pixel mirror relative to the substrate. However, as a distance between the pixel mirror and the substrate decreases, the electrostatic force increases in proportion to a reciprocal of the square of the distance, which may cause the pixel mirror come into contact with the substrate, and may cause the substrate and the pixel mirror become bonded due to static friction and other causes. Even after the voltage is removed, the substrate and the pixel mirror may not separate automatically.

On the other hand, the existing micro-electronic pixel mirror structure generally includes a torsional central mechanical structure. Driven by a voltage, the pixel mirror rotates with an axis of the torsional central mechanical structure as a rotation axis. The torsional central mechanical structure limits the freedom of movement of the pixel mirror, resulting in a limited deflection angle of the pixel mirror. Furthermore, the torsional central mechanical structure needs to be built on a support column, which increases structural complexity.

SUMMARY

The present disclosure provides a micro-electronic non-landing mirror system to solve the problem in the prior art that the substrate and the pixel mirror cannot be restored to an original state due to static friction and other reasons, as well as the problems of complex structure of the system and low freedom of movement of the pixel mirror.

In order to solve the above technical problems, a technical solution adopted by the present disclosure is to provide a micro-electronic non-landing mirror system. The micro-electronic non-landing mirror system includes a substrate; at least two driving electrodes disposed on the substrate and at least two supporting assemblies disposed on the substrate, a number of the supporting assemblies being not greater than a number of the driving electrodes; a rotating mirror suspended over the at least two driving electrodes and elastically supported on the supporting assemblies through elastic reset assemblies one-to-one positioned relative to the supporting assemblies. Each elastic reset assembly includes at least two elastic reset units connected to different corner positions of the rotating mirror by one of the supporting assemblies. Each of the at least two elastic reset units is configured for providing the rotating mirror with at least two rotational degrees of freedom. A driving circuit configured for applying a driving voltage to one of the driving electrodes and the rotating mirror. When the driving circuit applies the driving voltage to one of the at least two driving electrodes and the rotating mirror, the rotating mirror moves closer to the driving electrode to which the driving voltage is applied within a range of movement that does not land on the substrate, so as to adjust a deflection angle of the rotating mirror. When the driving circuit removes the driving voltage, the rotating mirror gets back to move away from the driving electrode under elastic restoring force of the elastic reset assemblies.

The beneficial effect of the present disclosure is that the rotating mirror is elastically supported on the supporting assemblies corresponding to the elastic reset assemblies by at least two elastic reset assemblies including at least two elastic reset units. That is, at least four elastic reset units are used to support the rotating mirror on at least two supporting assemblies, so that the rotating mirror cannot make contact with the substrate in a working state. Therefore, the support for the rotating mirror is realized under the condition of using as few supporting structures as possible, which greatly simplifies the structural complexity and reduces the cost. Furthermore, at least four elastic reset units are connected to different corner positions of the rotating mirror to provide at least two rotational degrees of freedom to the rotating mirror, so that the rotating mirror can have a higher degree of freedom of movement, and achieve deflection through greater angles, which expands the application field of the micro-electronic mirror system.

DESCRIPTION OF EMBODIMENTS

The technical solutions in the embodiments of the present disclosure will be clearly and completely described below with reference to the drawings in the embodiments of the present disclosure. Obviously, the described embodiments are only some, but not all, embodiments of the present disclosure. Based on the embodiments of the present disclosure, all other embodiments obtained by those of ordinary skill in the art without creative efforts shall fall within the protection scope of the present disclosure.

Descriptions involving "first", "second", etc. in the embodiments are only used for the purpose of description, and should not be construed as indicating or implying relative importance or implicitly indicating the number of technical features. Thus, a feature delimited with "first", "second" may expressly or implicitly include "at least one of" the feature. In addition, the technical solutions between the various embodiments can be combined with each other, as realized by those of ordinary skill in the art. When the combination of technical solutions contradicts each other or cannot be realized, it should be considered that such combination of technical solutions does not exist and is not within the protection scope of the present disclosure.

The state of being permanently suspended (or "non-landing") in the present disclosure specifically refers to a rotating mirror of a system not being able to contact a substrate during operation, which is different from the technical solution of limiting the rotating mirror by contacting the rotating mirror with the substrate.

Figure 1:
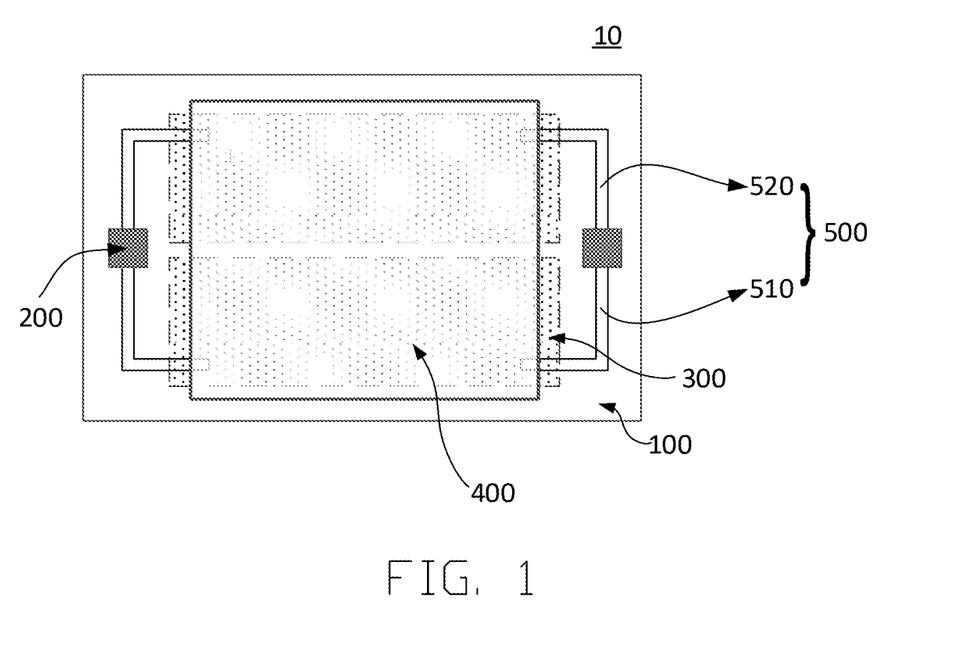
FIG. 1 is a schematic top view of a micro-electronic non-landing mirror system according to a first embodiment of the present disclosure.

FIG. 1 shows a micro-electronic non-landing mirror system according to a first embodiment of the present disclosure. A micro-electronic non-landing mirror system 10 includes a substrate 100, supporting assemblies 200, driving electrodes 300, a rotating mirror 400, elastic reset assemblies 500, and a driving circuit (not shown).

In this embodiment, the number of the driving electrodes 300 is two, and the two driving electrodes 300 are disposed on the substrate 100. Specifically, the two driving electrodes 300 are on a same surface of the substrate 100 and spaced apart from each other. The supporting assemblies 200 are also disposed on the substrate 100, and the number of the supporting assemblies 200 in this embodiment is also two. The rotating mirror 400 is located on a side of the two driving electrodes 300 away from the substrate 100. Specifically, the rotating mirror 400 is suspended near the two driving electrodes 300 (the driving electrodes 300 are represented by dotted lines in the figures to indicate the location of the driving electrodes 300 as being below the rotating mirror 400). The rotating mirror 400 is elastically supported on the two supporting assemblies 200 through two sets of elastic reset assemblies 500, each set of elastic reset assemblies includes at least two elastic reset units 510 and 520, and the at least two elastic reset units 510 and 520 are connected to different corners of the rotating mirror 400 by the same supporting assembly 200. At least two rotational degrees of freedom of the rotating mirror 400 are provided by the at least four elastic reset units connected to different corners of the rotating mirror 400. In the present disclosure, the elastic reset assemblies are in a one-to-one correspondence with the supporting assemblies, and the number of the elastic reset assemblies is equal to the number of the supporting assemblies, and the elastic reset units connected to the same supporting assembly are regarded as belonging to one elastic reset assembly. In the embodiment, one set of elastic reset assembly including two elastic reset units is illustrated. It can be understood that, in other embodiments, a set of elastic reset assembly may include three or more elastic reset units.

The driving circuit is configured to apply a driving voltage between the driving electrodes 300 and the rotating mirror 400. Specifically, when the driving circuit applies a driving voltage to at least one of the two driving electrodes 300 and the rotating mirror 400, the rotating mirror 400 is attracted to the driving electrodes 300 to which the driving voltage is applied due to electrostatic attraction, thereby adjusting the deflection angle of the rotating mirror 400, and when the driving circuit releases the applied driving voltage, the rotating mirror 400 moves away from the driving electrodes 300 under elastic restoring force of each elastic reset assembly 500. In the present disclosure, the rotating mirror 400 approaches or moves away from the driving electrodes within a range of motion that does not allow contact with the substrate 100, and a maximum deformation of each elastic reset assembly 500 is used as a limiting boundary instead of touching the substrate. Therefore, after the rotating mirror touches the substrate, any direct adhesion and static friction force between the rotating mirror and the substrate is prevented, and the possibility of failure is reduced.

In the above-mentioned embodiment, further, in each elastic reset assembly, the elastic reset assembly away from the driving electrodes to which the driving voltage is applied provides a restraining force on the rotating mirror, so as to complete that the rotating mirror does not land on the substrate, and prevent the rotating mirror from sticking after landing. In the previous technical solutions, a position recovery of the rotating mirror is usually achieved by using a torsion hinge along a rotation center line of the rotating mirror, which does not act as a limit on a maximum rotation angle of the rotating mirror, the only limit on the deflection angle of the rotating mirror is physical contact between the rotating mirror and the substrate. However, in the present disclosure, at least four elastic reset units are used to elastically support the rotating mirror at different corners of the rotating mirror. When the rotating mirror moves downward toward the substrate, the elastic reset units at the far end pulls and restrain from above, which limits the maximum deflection angle of the rotating mirror with different technical routes, and avoids a series of problems of the previous technical solution.

Figure 2:
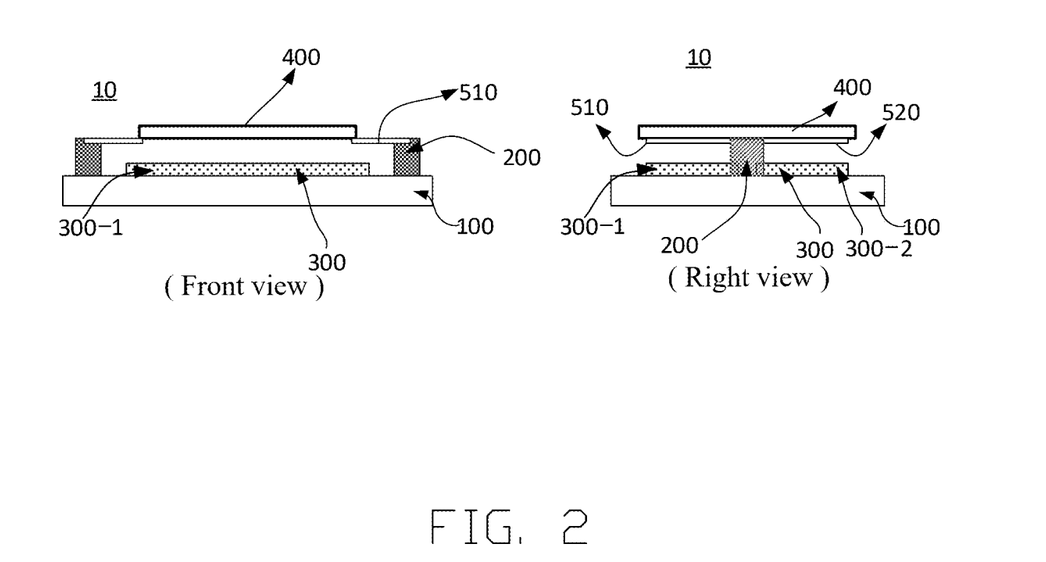
FIG. 2 shows a schematic view from the front and a schematic view from the right hand side of the micro-electronic non-landing mirror system in FIG. 1 when no driving voltage is applied.
Figure 3:
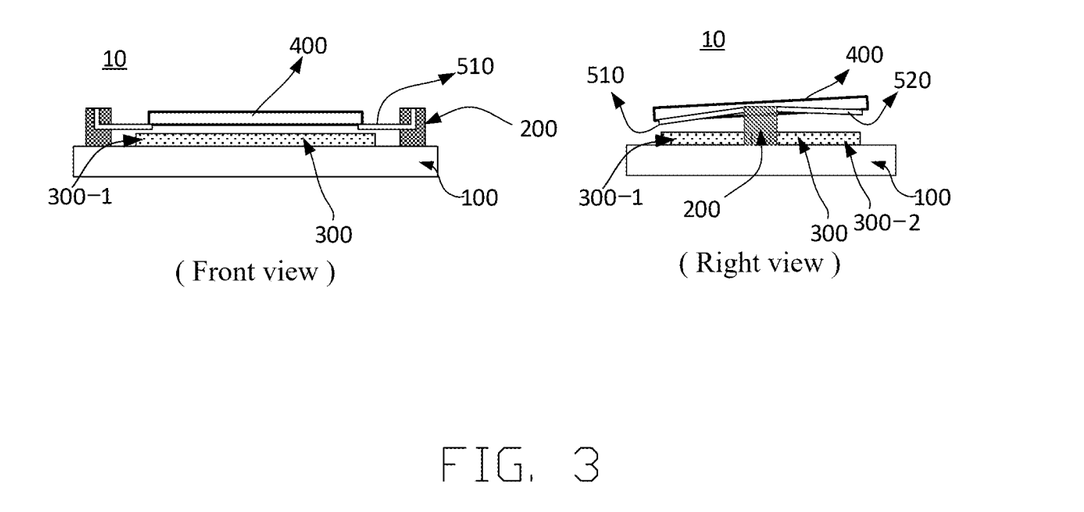
FIG. 3 shows a schematic view from the front and a schematic view from the right side of the micro-electronic non-landing mirror system in FIG. 1 when a driving voltage is applied.

FIG. 2 shows a schematic front view and a schematic right view of the micro-electronic non-landing mirror system in FIG. 1 when no driving voltage is applied. FIG. 3 shows a schematic front view and a schematic right view of the micro-electronic non-landing mirror system in FIG. 1 when a driving voltage is applied. The driving electrodes 300 include a first driving electrode 300-1 and a second driving electrode 300-2, which are arranged on the substrate 100 side by side, and are located between the two supporting assemblies.

For the driving electrodes 300, when the driving circuit independently applies a driving voltage to one of the driving electrodes such as 300-1, since the rotating mirror 400 is grounded through the elastic reset assemblies 500 and the supporting assemblies 200, a voltage difference and charge distribution are generated between the driving electrode 300-1 and the rotating mirror 400, so that the rotating mirror 400 moves toward the driving electrode 300-1 under the action of electrostatic force, and drives the elastic reset unit 510 to move toward the driving electrode, so that the elastic reset unit 510 is deformed. At the same time, as the rotating mirror 400 is entirely pulled toward the driving electrode 300-1 by the electrostatic force, the elastic reset unit 520 away from the driving electrode 300-1 pulls the rotating mirror 400 back, thereby providing a restraining force on the rotating mirror 400.

Specifically, in this embodiment, a projection of a line connecting centers of the two driving electrodes on the substrate intersects with a projection of a line connecting centers of the two supporting assemblies on the substrate. From a perspective of force bearing, this technical solution enables the two elastic reset units respectively connected to the two support assemblies to deform at the same time when the rotating mirror 400 is deflected towards the drive electrode 300-1, and the remaining two elastic reset units respectively connected to the two support assemblies provide restraining force at the same time, so that the force on the rotating mirror is more balanced. Furthermore, when the rotating mirror 400 is deflected toward the other driving electrode 300-2, the elastic reset units of the two elastic reset assemblies provide restoring and restraining forces at the same time, which makes force bearing to be close when the rotating mirror 400 deflects toward the driving electrodes 300-1 and 300-2, and the control of the deflection angle can be more precise. The situation of inconsistent deformation caused by a device tolerance of the two sets of elastic reset assemblies when a set of elastic reset assemblies independently provides a restraining force is avoided.

In this embodiment, each of the elastic reset units 510 and 520 includes an L-shaped elastic bar, each side of which can be elastically deformed, thereby providing two rotational degrees of freedom for the rotating mirror 400. Specifically, the rotating mirror 400 is a square shaped, the L-shaped elastic strips in this embodiment respectively include two sides parallel to the two sides of the square rotating mirror 400. When the rotating mirror 400 moves toward the direction close to the driving electrode 300-1, one side of the L-shaped elastic strip parallel to the moving direction is mainly deformed. When the rotating mirror 400 moves toward one supporting assembly, the other side of the L-shaped elastic strip is mainly deformed. The main deformation of one side here does not mean that the other side is not deformed, but the degree of deformation is relatively slight.

In other specific embodiments of the present disclosure, the shape of the rotating mirror 400 is not limited. Specifically, it can be a rectangle, a triangle, a circle, and other regular or irregular polygon. The two sides of the L-shaped elastic strip are not necessarily parallel to one of the sides of the rotating mirror. In general, the elastic reset unit includes a bending structure, which can be elastically deformed in two directions.

Figure 4:
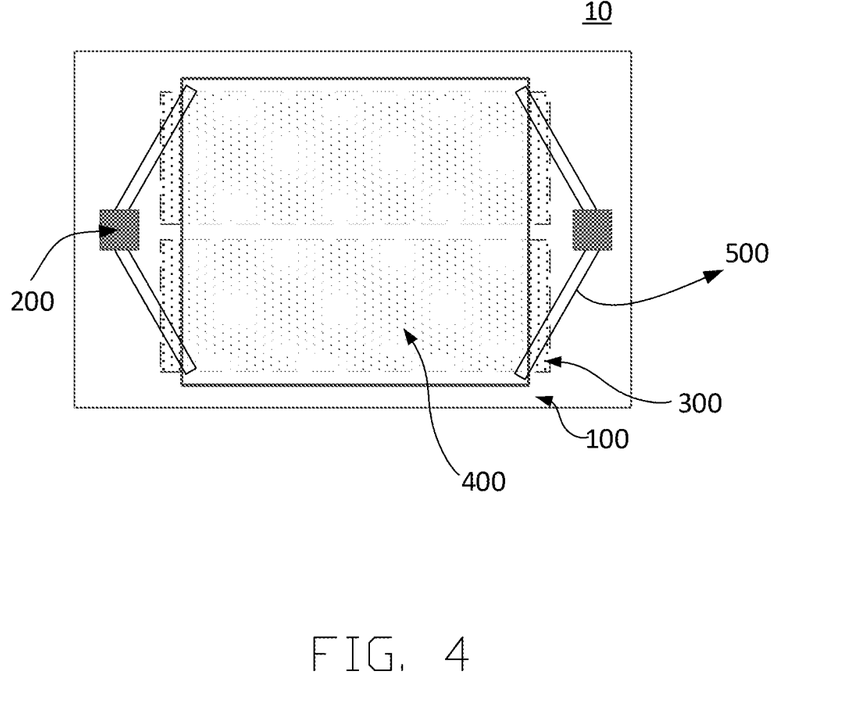
FIG. 4 is a schematic top view of the micro-electronic non-landing mirror system according to a modified embodiment of the present disclosure.

In other embodiments of the present disclosure, other shapes or types of elastic return elements may also be adopted. FIG. 4 is a schematic top % view of the micro-electronic non-landing mirror system according to a modified embodiment of the present disclosure. Each elastic reset unit of each elastic reset assembly 500 includes a linear elastic strip. The at least two elastic reset units of each elastic reset assembly 500 are obliquely connected at different corners of the rotating mirror 400 to the supporting assembly 200, respectively. In this technical solution, through the inclined arrangement of the linear elastic strips, the linear elastic strips can be stretched and deformed in two vertical directions, so that the rotating mirror 400 has multiple degrees of freedom of movement.

Figure 5:
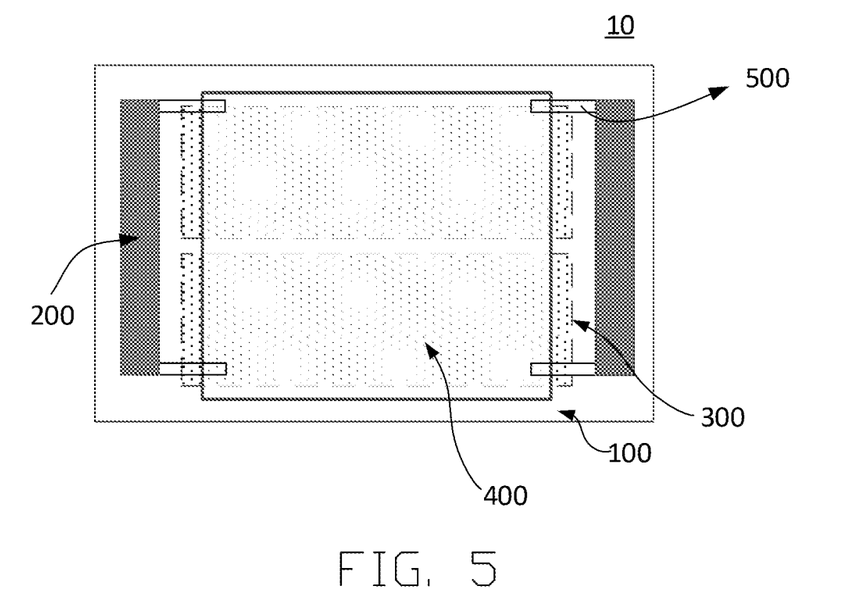
FIG. 5 is a schematic top view of the micro-electronic non-landing mirror system according to another modified embodiment of the present disclosure.

FIG. 5 shows a schematic top view of the micro-electronic non-landing mirror system according to another modified embodiment of the present disclosure. In this embodiment, each elastic reset unit of each elastic reset assembly 500 includes a linear elastic strip, the supporting assembly 200 is elongated, and the linear elastic strip is parallelly arranged between the rotating mirror 400 and the supporting assemblies 200. Specifically, four linear elastic strips support two opposite sides of the rotating mirror 400 two by two. When the rotating mirror 400 swings in a direction parallel to the linear elastic strip, the linear elastic strip is stretched and deformed; when the rotating mirror 400 swings in a direction perpendicular to the linear elastic strip, the linear elastic strip is twisted and deformed. In any case, the linear elastic strip mainly relies on the restraining force along the length direction of the linear elastic strip to restrain and pull back the rotating mirror 400 to prevent the rotating mirror 400 from landing the substrate 100.

Figure 6:
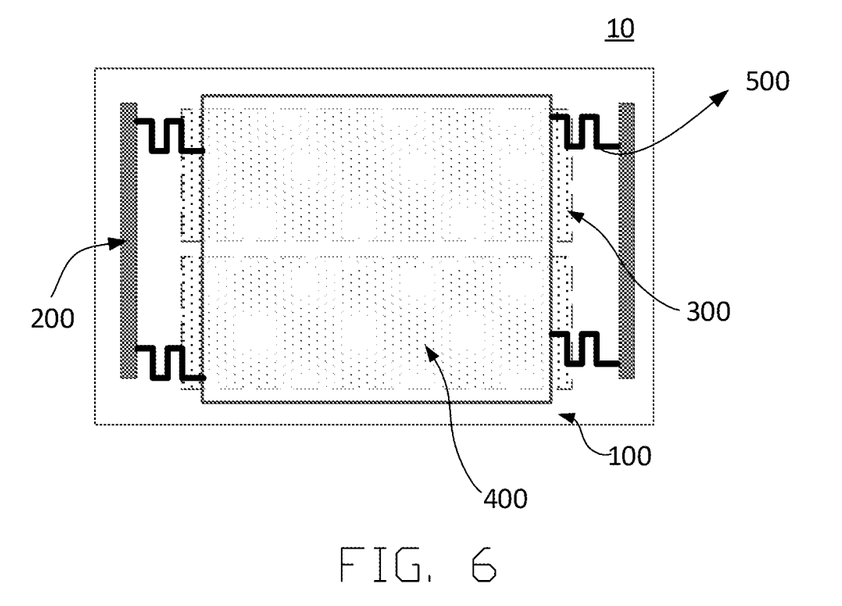
FIG. 6 is a schematic top view of the micro-electronic non-landing mirror system according to another modified embodiment of the present disclosure.

FIG. 6 shows a schematic top view of the micro-electronic non-landing mirror system according to another modified embodiment of the present disclosure. In this embodiment, each elastic reset unit of each elastic reset assembly 500 includes a serpentine spring. Compared with the embodiment shown in FIG. 5, the serpentine spring in this embodiment can be elastically stretched and deformed along two intersecting directions, thereby providing the rotating mirror 400 with freedom of movement in at least two directions, and providing the rotating mirror 400 with restoring force and restraining force.

Figure 7:
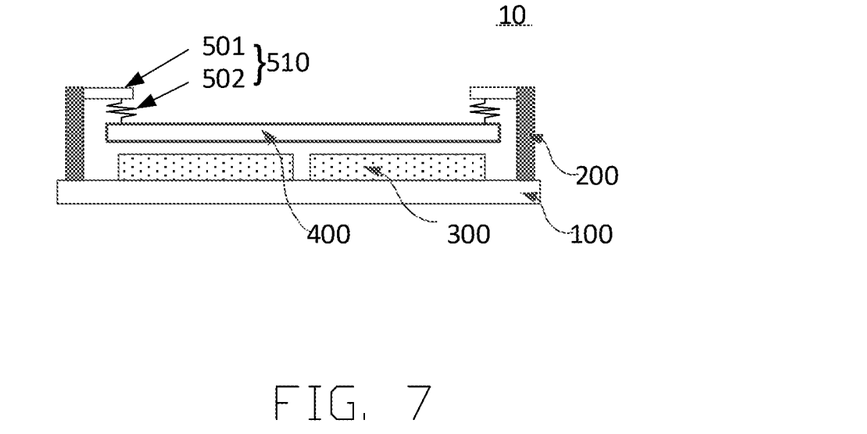
FIG. 7 is a schematic front view of a micro-electronic non-landing mirror system according to a second embodiment provided by the present disclosure.

FIG. 7 shows a schematic front view of a micro-electronic non-landing mirror system according to a second embodiment provided by the present disclosure. Different from the above-mentioned embodiments, each elastic reset unit 510 of each elastic reset assembly in this embodiment includes a spring 502 and a suspension portion 501. Each suspension portion 501 extends from one supporting assembly 200 to above a corner of the rotating mirror 400. Each spring 501 connects the suspension portion 502 and the rotating mirror 400, and a length direction of the spring 501 is perpendicular to a major plane where the rotating mirror is at a rest position (i.e., the state shown in the figure). In this technical solution, when the rotating mirror 400 is driven to be close to the electrodes 300 under the action of electrostatic force, the springs 501 away from the driving electrodes 300 provide a restraining force for the rotating mirror 400 to prevent the rotating mirror 400 from landing on the substrate 100.

In the above embodiments, two driving electrodes are used as an example. In other embodiments of the present disclosure, there may be more than two driving electrodes to achieve greater range and finer control of the rotating mirror.

Figure 8:
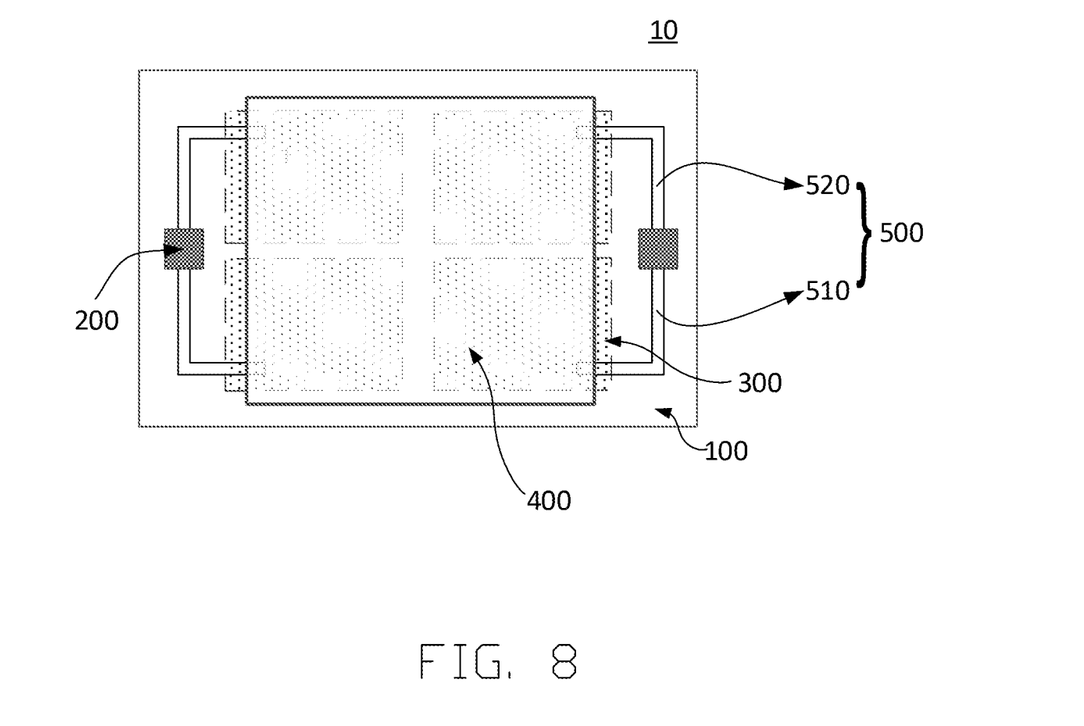
FIG. 8 is a schematic top view of a micro-electronic non-landing mirror system according to a third embodiment provided by the present disclosure.

FIG. 8 shows a schematic top view of a micro-electronic non-landing mirror system according to a third embodiment provided by the present disclosure. In this embodiment, the micro-electronic non-landing mirror system 10 includes four driving electrodes 300, and only two supporting assemblies 200. The four driving electrodes 300 are arranged on the substrate 100 in an array and are located between two supporting assemblies 200. By applying a driving voltage to any one or two of the four driving electrodes 300, the rotating mirror 400 can be driven to approach these driving electrodes. For example, by applying a driving voltage to the two driving electrodes on the right side in the figure, the rotating mirror 400 is deflected right, and by applying a driving voltage to the upper two driving electrodes in the figure, the rotating mirror 400 is deflected up, which greatly improves the control precision of the rotating mirror.

It can be understood that for other modified implementations based on the third embodiment, reference may be made to the technical solutions of the elastic reset units in the above-embodiments and modified embodiments, which will not be repeated here.

In each embodiment of the present disclosure, contact points of each elastic reset unit and the rotating mirror are sequentially connected to form a polygon, and the geometric center of the polygon coincides with a center point of the rotating mirror, so that the rotating mirror can maintain balance.

In the present disclosure, the restoring force of the elastic reset assembly and the electrostatic force become a pair of positively correlated forces. When a rotation angle of the rotating mirror increases, the electrostatic force increases, and the restoring force of the elastic reset assembly also increases. The directions of the two forces are roughly opposite, so that the overall resultant force on the rotating mirror is reduced, and the time when the rotating mirror is in an unstable state is reduced. Within the range of the deflection angle of the rotating mirror, by controlling the driving voltage, the restoring force and electrostatic force received by the rotating mirror at any specific deflection angle can be balanced, so that the rotating mirror can be held stably in a particular deflection angle, so as to achieve steady state at any angle. This technical solution makes the micro-electronic non-landing mirror system no longer a digital device that only responds to either zero or one, but an analog device that can respond to fractions (in digital form) between 0 and 1, which greatly improves the adaptability of the micro-electronic non-landing mirror system to the application environment.

It can be understood that the micro-electronic non-landing mirror system of the present disclosure may include a steady state with multiple continuous angular distributions. For example, the steady state of any angle can be achieved in the range of two continuous angle distributions of −12° to −3° and 3° to 12°. In view of the fact that the rotating mirror is more prone to trembling or shaking when the electrostatic force and restoring force are small, the missing angle distribution of −3° to 3° in the middle does not serve as the steady-state angle range of the microelectronic non-landing mirror system. The above is only an example, and does not limit the specification of the present disclosure to the angular range in which the micro-electronic non-landing mirror system can achieve a steady state, and other angular ranges are also possible.

To sum up, in the above-mentioned embodiments, the driving voltage is applied between the driving electrodes and the rotating mirror, so that the rotating mirror can be brought close to the driving electrodes. Furthermore, by providing the elastic reset assemblies, after the voltage applied to the driving electrodes and the rotating mirror is released, the rotating mirror will move away from the driving electrodes to restore the original state under the action of the elastic restoring force of the elastic reset assemblies. Further, by making the deformation direction of the elastic reset assemblies correspond to the deflection direction of the rotating mirror, interference caused to the rotating mirror is reduced, so that the deflection angle of the rotating mirror can be linearly controlled to achieve a more precise angle deflection effect.

The above are only the embodiments of the present disclosure, and are not intended to limit the scope of the present disclosure. Any equivalent results or equivalent process transformations made by using the contents of the description and drawings of the present disclosure, or directly or indirectly applied in other related technical fields, all are similarly included in the scope of patent protection of the present disclosure.

What is claimed is:

1. A micro-electronic non-landing mirror system, comprising:
   a substrate;
   at least two driving electrodes disposed on the substrate;
   at least two supporting assemblies disposed on the substrate;
   elastic reset assemblies;
   a rotating mirror suspended over the at least two driving electrodes and elastically supported on the supporting assemblies through the elastic reset assemblies one-to-one positioned relative to the supporting assemblies, each of the elastic reset assemblies comprising at least two elastic reset units connected to different corners of the rotating mirror by a corresponding one of the supporting assemblies, each of the at least two elastic reset units being configured for providing the rotating mirror with at least two rotational degrees of freedom; and
   a driving circuit configured for applying a driving voltage to one of the driving electrodes and the rotating mirror;
   wherein when the driving circuit applies the driving voltage to one of the at least two driving electrodes and the rotating mirror, the rotating mirror moves closer to the driving electrode to which the driving voltage is applied within a range of movement that does not land on the substrate, so as to adjust a deflection angle of the rotating mirror; when the driving circuit removes the driving voltage, the rotating mirror gets back to move away from the driving electrode under elastic restoring force of the elastic reset assemblies; and
   the rotating mirror is supported without a central torsion hinge.

2. The micro-electronic non-landing mirror system of claim 1, wherein the elastic reset assembly away from the driving electrode having the driving voltage provides a restraining force, thus restraining the rotating mirror from landing on the substrate.

3. The micro-electronic non-landing mirror system of claim 2, comprising two of the supporting assemblies, two of the driving electrodes, wherein the driving electrodes are arranged on the substrate side by side and are located between the supporting assemblies.

4. The micro-electronic non-landing mirror system of claim 3, wherein a projection of a line connecting centers of two of the driving electrodes on the substrate intersects with a projection of a line connecting centers of two of the supporting assemblies on the substrate.

5. The micro-electronic non-landing mirror system of claim 2, comprising two of the supporting assemblies, four of the driving electrodes wherein four of the driving electrodes are disposed on the substrate in an array, the array is located between the supporting assemblies.

6. The micro-electronic non-landing mirror system of claim 5, wherein each of the elastic reset assemblies comprises two elastic reset units, and a projection of each of the elastic reset units on the substrate at least partially overlaps with a corresponding one of the driving electrodes.

7. The micro-electronic non-landing mirror system of claim 1, wherein each of the elastic reset units comprises an elastic strip comprising a bending structure, and the elastic strip is elastically deformable in two directions by the bending structure.

8. The micro-electronic non-landing mirror system of claim 1, wherein each of the elastic reset units comprises a serpentine spring.

9. The micro-electronic non-landing mirror system of claim 1, wherein each of the elastic reset units comprises a linear elastic strip, and the at least two elastic reset units of each of the elastic reset assemblies are obliquely connected at different corners of the rotating mirror to the corresponding one of the support assemblies, respectively.

10. The micro-electronic non-landing mirror system of claim 1, wherein each of the elastic reset units comprises a linear elastic strip, the supporting assembly is elongated, and the linear elastic strips are arranged in parallel between the rotating mirror and the supporting assemblies.

11. The micro-electronic non-landing mirror system of claim 1, wherein the elastic reset unit comprises a spring and a suspension portion, wherein the suspension portion extends from the corresponding one of the support assemblies to directly above a corner of the rotating mirror, the spring connects the suspension portion and the rotating mirror, and a length direction of the spring is perpendicular to a major plane where the rotating mirror is at a rest position.

12. The micro-electronic non-landing mirror system of claim 1, wherein the center of gravity of a geometric shape outlined by contact points of each of the elastic reset units and the rotating mirror coincides with a center point of the rotating mirror.

13. The micro-electronic non-landing mirror system of claim 1, wherein within a range of the deflection angle of the rotating mirror, a steady state of the rotating mirror at any angle can be achieved by controlling the driving voltage.

14. A micro-electronic non-landing mirror system, comprising:
   a substrate;
   at least two driving electrodes disposed on the substrate;
   at least two supporting assemblies disposed on the substrate;
   elastic reset assemblies;
   a rotating mirror suspended over the at least two driving electrodes and elastically supported on the supporting assemblies through the elastic reset assemblies one-to-one positioned relative to the supporting assemblies, each of the elastic reset assemblies comprising at least two elastic reset units connected to different corners of the rotating mirror by a corresponding one of the supporting assemblies, each of the at least two elastic reset units being configured for providing the rotating mirror with at least two rotational degrees of freedom; and
   a driving circuit configured for applying a driving voltage to one of the driving electrodes and the rotating mirror;
   wherein when the driving circuit applies the driving voltage to one of the at least two driving electrodes and the rotating mirror, the rotating mirror moves closer to the driving electrode to which the driving voltage is applied within a range of movement that does not land on the substrate, so as to adjust a deflection angle of the rotating mirror; when the driving circuit removes the driving voltage, the rotating mirror gets back to move away from the driving electrode under elastic restoring force of the elastic reset assemblies; and the elastic reset unit comprises a spring and a suspension portion, wherein the suspension portion extends from the corresponding one of the support assemblies to directly above a corner of the rotating mirror, the spring connects the suspension portion and the rotating mirror, and a length direction of the spring is perpendicular to a major plane where the rotating mirror is at a rest position.

15. The micro-electronic non-landing mirror system of claim 14, wherein the elastic reset assembly away from the driving electrode having the driving voltage provides a restraining force, thus restraining the rotating mirror from landing on the substrate.

16. The micro-electronic non-landing mirror system of claim 15, comprising two of the supporting assemblies, two of the driving electrodes, wherein the driving electrodes are arranged on the substrate side by side and are located between the supporting assemblies.

17. The micro-electronic non-landing mirror system of claim 16, wherein a projection of a line connecting centers of two of the driving electrodes on the substrate intersects with a projection of a line connecting centers of two of the supporting assemblies on the substrate.

18. The micro-electronic non-landing mirror system of claim 15, comprising two of the supporting assemblies, four of the driving electrodes wherein four of the driving electrodes are disposed on the substrate in an array, the array is located between the supporting assemblies.

19. The micro-electronic non-landing mirror system of claim 18, wherein each of the elastic reset assemblies comprises two elastic reset units, and a projection of each of the elastic reset units on the substrate at least partially overlaps with a corresponding one of the driving electrodes.

20. The micro-electronic non-landing mirror system of claim 14, wherein the center of gravity of a geometric shape outlined by contact points of each of the elastic reset units and the rotating mirror coincides with a center point of the rotating mirror.

* * * * *